Patented Sept. 20, 1938

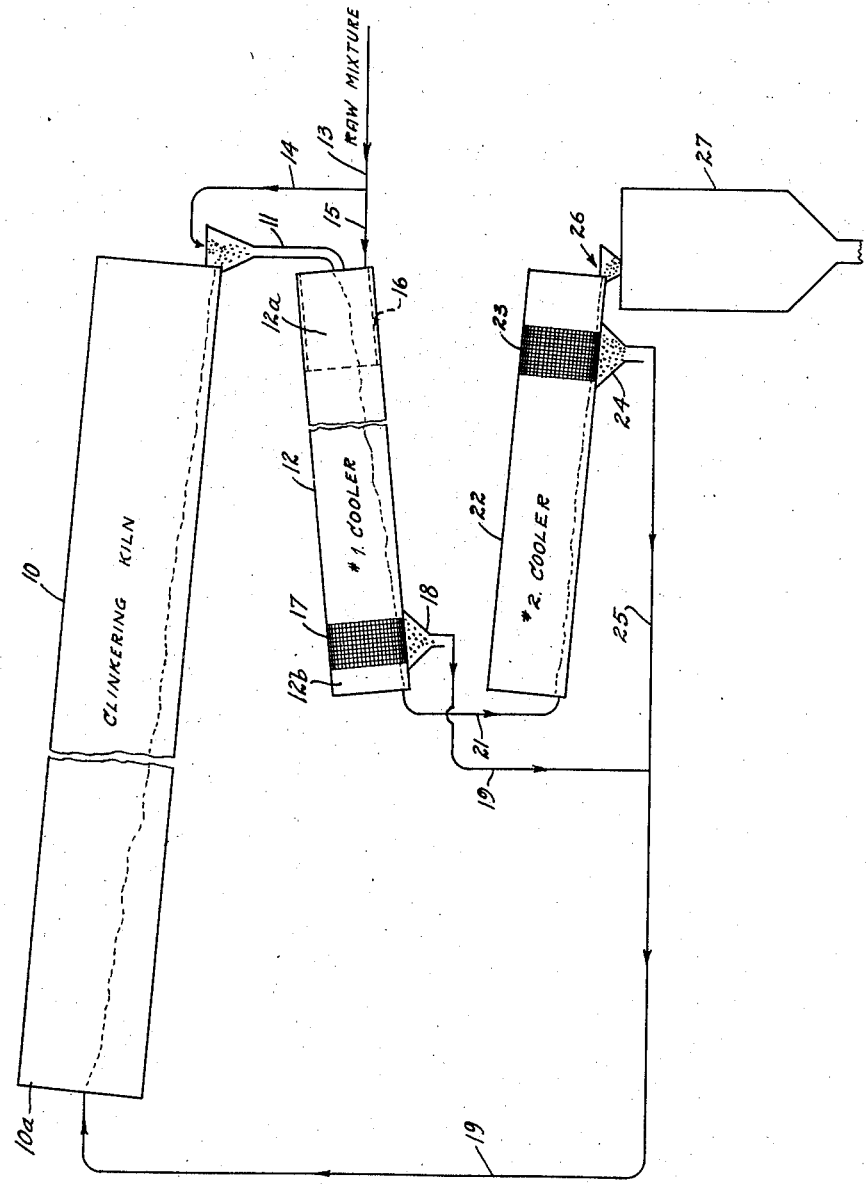

2,130,624

UNITED STATES PATENT OFFICE 2,130,624

PROCESS OF MANUFACTURING PORTLAND CEMENT

Harry E. Kaiser, Colton, Calif., assignor to California Portland Cement Company, Los Angeles, Calif., a corporation of California Application September 20, 1937, Serial No. 164,686

18 Claims. (Cl. 263—53)

This invention has to do with an improved process for manufacturing Portland cement, and has for its primary object to materially reduce the cost of manufacture by effecting heat economies in the clinker forming stage of the process. A further object of the invention is to utilize a single heat absorbing medium comprising argillaceous and calcareous materials suitable as Portland cement forming ingredients, for the dual purpose of rapidly quenching Portland cement clinker, and conserving the heat absorbed by the materials from the clinker by introducing the materials while in heated condition into a Portland cement clinkering kiln. In the broad aspects of the invention any suitable argillaceous and calcareous mixture may be used as the quenching and heat retaining medium, although I prefer to employ a ground Portland cement raw mixture, which may be defined as comprising a mixture of argillaceous and calcareous materials which when calcined to temperatures of incipient fusion will result in the formation of Portland cement clinker as known by accepted standards. As will appear, a great number of advantages result from using a Portland cement raw mixture of completed composition such that after separation from the quenching clinker, the raw mixture is suitable, without further adjustment of composition, for calcination to produce Portland cement clinker.

Although that aspect of the present process involving the quenching of Portland cement clinker by the use of a finely ground Portland cement raw mixture is more specifically dealt with in my copending application, Ser. No. 164,687, filed Sept. 20, 1937, on Portland cement clinker quenching process, some of the advantages in using such raw mixture as a quenching medium may be referred to herein since they have an important bearing on those objects of the present invention that have to do more generally with the added efficiency of entire clinker forming process.

Since the chemical composition of the Portland cement raw mixture has a direct bearing upon the effectiveness of the mixture as a medium for quenching the Portland cement clinker, raw mixtures which I propose to use may further be defined with respect to chemical composition as containing 12.0% to 26.0% silica ($SiO_2$), or equivalent, and 70% to 85% calcium carbonate ($CaCO_3$), or equivalent, plus the usual percentages of other normal ingredients of Portland cement raw mixtures. The chemical composition of the raw mixture used for quenching the Portland cement clinker is of significance from two standpoints: First, because of its effect upon the mixture as a quenching medium, and second, because of the effect upon the mixture when heated during the quenching stage, preliminarily to calcination to Portland cement clinker after separation from the quenched clinker. It is intended that ordinarily the raw mixture will become heated by the clinker in the quenching operation to a temperature such that some of the raw mixture particles, particularly those in direct contact with the hot clinker particles, will undergo incipient calcination. From the standpoint of quenching, the calcium carbonate content of the raw mixture is of significance in that the endothermic liberation of carbon dioxid upon calcination, enters into a consideration of the total heat absorbing capacity or total effective specific heat of the raw mixture. This term includes other factors, and while variable in accordance with a predetermined degree of calcination, it may be defined as the amount of heat required to dehydrate the raw mixture, raise its temperature to the point at which incipient calcination will start, and continue calcination to the desired degree. Consequently, for quenching purposes, a Portland cement raw mixture has the advantage that its calcium carbonate content is sufficiently high to permit calcination to an extent that in effect will give the mixture a higher heat absorbing capacity than a material containing no calcium carbonate, or having comparatively low calcium carbonate content. This is largely due to the fact that there are a greater number of calcium carbonate particles to be brought into contact with the hot clinker.

From the standpoint of subsequent calcination of the quenching material after separation from the quenched clinker, to produce Portland cement clinker, the utilization of a Portland cement raw mixture at the quenching stage is highly important and advantageous. Partial calcination of the raw mix at this point lessens the load on the kiln within which the separated mixture subsequently is calcined and therefore increases the capacity of a given size kiln. To the same end, preliminary heating of the raw mixture at the quenching stage substantially lowers the required heat input to the kiln by reason of the residual heat contained in the raw mixture.

Brief mention may be made of a number of apparent advantages resulting from quenching Portland cement clinker by sudden and intimate admixture with finely ground Portland cement raw mixture. By thus quenching the clinker immediately or very shortly after it passes from the clinkering zone of the kiln, there is a tendency to "freeze" the equilibrium which has been set up at the clinkering temperatures between the various compounds in the clinker, and as a result, various desirable chemical and physical properties of the product cement are enhanced. Quenching appears to promote ease of grindability, and the resultant clinker has a less tendency to "dust" than normally. Further tests indicate that cementitious or concrete mixtures made with cement from the quenched clinker show materially lower degrees of expansion when subjected to the standard tests. It also appears that beneficial effects are had upon the properties of the clinker by quenching the clinker with the raw mixture and permitting the clinker to cool in an atmosphere of carbon dioxid released upon incipient calcination of the raw mixture.

In accordance with the invention, the hot clinker is admixed with finely ground Portland cement raw mixture, preferably immediately after the clinker leaves the clinkering zone of the kiln, in order that the "freezing" effect of quenching may be had upon the clinker while it is still as close as possible to the clinkering temperature of the kiln. The raw mixture may be cold, or it may be mildly heated, so long as ample temperature differential exists between the clinker and raw mix in accordance with the proportions used. In the broad aspects of the invention, any suitable quantity or proportion of relatively cold raw mixture may be admixed with the clinker that will produce the desired and proper quenching effect, but in general, and particularly where the heated raw mixture after separation from the clinker is to be used to feed the kiln within which the clinker is being produced, I prefer to introduce the ground raw mixture to the quenching stage at a rate such that the potential Portland cement quantity of the raw mixture added will correspond substantially to the quantity of clinker admixed therewith. By "potential Portland cement quantity" of raw mixture I mean the quantity of Portland cement clinker that a given amount of the raw mixture will produce upon calcination at Portland cement clinker forming temperatures. Thus, for most efficient and economical operation, the raw mixture will be added to the clinker in which quenching operation at a rate corresponding to the capacity of the kiln to properly handle the raw mixture in the condition in which it exists after separation from the clinker, the condition being that the raw mixture then is preheated and, preferably, partially calcined.

In order to obtain desirable rapidity and uniformity in quenching, the raw mixture and clinker are rapidly and intimately admixed in any suitable manner, for example in an elongated cylinder that is rotated to give continuous mixing agitation. With the further view of enhancing rapid quenching by promoting intimacy of contact between the raw mix and clinker particles, the raw mixture preliminarily is rather finely ground, for example to a particle size passing such that substantially all will pass a fifty mesh screen, and 70% to 100% will pass a two hundred mesh screen.

The admixture of clinker and raw mix is maintained in the cooling zone (cylinder) for a period of time required to drop the clinker temperature through the proper quenching range. Various factors may enter into the time element, but it may be stated, as illustrative, that ordinarily it will be desirable to cool the clinker from a temperature that may range between 1800 to 2600° F., to a temperature under 1000° F., within a period of eight minutes. Preferably the relative proportions of admixed clinker and raw mixture will be such that by heat transfer from the clinker, the raw mixture will become heated to a temperature within, for example, the range of from 700° F. to 1100° F. As a result of the liberation of carbon dioxid within the atmosphere of the cooling zone, the clinker cools in a neutral atmosphere which, as indicated above, apparently produces beneficial effects on the properties of the clinker and cement.

After the clinker has become quenched, the raw mixture then is separated from the clinker in one or more separating or screening stages to free the clinker from adhering raw mixture particles. The clinker then may be ground or processed by any of the usual methods of producing Portland cement. The separated, heated and partially calcined raw mixture preferably is immediately and continuously passed to the feed end of the clinker forming kiln, thus serving as a heat carrying medium for returning to the kiln heat that normally is contained in the clinker. The apparent economic advantage of course is a material saving in kiln fuel costs and an increase in the capacity of a given size kiln. These same economies are further favored by the extent to which the raw mixture has undergone preliminary calcination when admixed with the hot clinker in the quenching stage. Summing up, the net result is increased capacity of the kiln for given heat input, and a substantial saving in the amount of heat required to produce a unit weight of cement clinker.

The foregoing description of the invention may perhaps be amplified to advantage and reference to the accompanying drawing which shows, in flow sheet form, a typical and illustrative system for carrying out the process.

Portland cement clinker formed in the clinkering kiln 10 is delivered by suitable means, conventionally illustrated by chute 11, into the upper end of an elongated cylindric cooler 12 that preferably is slowly rotated by suitable means, not shown. The finely ground Portland cement raw mixture may be fed from a conveyor line 13 through line 14 to be admixed with the hot clinker at the inlet end of chute 11 and directly after the clinker leaves the kiln, or the raw mixture may be taken via line 15 and fed into the inlet end 12a of the cooling chamber. As illustrated, the feed end of the chamber may contain a suitable refractory lining 16. The clinker and raw mixture are rapidly brought into intimate contact and subjected to thorough admixture within the rotating cooler 12. The admixture will remain in the cooler for a period of time required to quench the clinker through the proper temperature range, and as observed in the foregoing, during this time the raw mixture preferably will undergo incipient calcination resulting in the liberation of carbon dioxid within the cooler. At the discharge end 12b of the cooler, the material passes over a perforated or screen section 17 of the cooler shell, at which point the raw mixture particles, being smaller than the pieces of clinker, pass through the screen into a hopper 18 from which the material is carried by conveyor line 19 to the feed end 10a of the clinkering kiln. If desired, line 19 may consist of an insulated conveyor course properly insulated to reduce heat losses from the preheated raw mixture.

For the purpose of further cooling the clinker to a temperature suitable for handling or storage, and in order to subject the clinker to any further agitation necessary to remove adhering particles of raw mixture, the clinker leaving cooler 12 may be conveyed through line 21 to a second rotating cooler 22. This cooler may also have one or more screen sections 23 through which the freed raw mixture particles will pass into hopper 24 to be conveyed, via line 25, together with the first separated material in line 19, to the feed end of the kiln. The clean clinker finally is discharged at 26 into the clinker storage bin 27. A very small percentage of fine clinker particles may pass through the screens 17 and 23 together with the separated raw mixture particles. The presence of a small percentage of clinker particles in the separated raw mixture is believed advantageous in that these particles likely have a tendency to enhance and promote clinker formation upon heating the raw mixture to incipient fusion in the clinkering kiln.

I claim:

1. The process that includes, admixing finished hot Portland cement clinker with relatively cool argillaceous and calcareous materials to cool the clinker and heat said materials, then separating said materials from the clinker and calcining said materials at a temperature of incipient fusion to produce Portland cement clinker.

2. The process that includes, admixing finished hot Portland cement clinker with relatively cool argillaceous and calcareous materials to cool the clinker and heat said materials, then separating said materials from the clinker and calcining said materials while heated by heat derived from said clinker, at a temperature of incipient fusion to produce Portland cement clinker.

3. The process that includes, rapidly quenching finished hot Portland cement clinker by intimately admixing the clinker with relatively cool argillaceous and calcareous materials to cool the clinker and heat said materials, then separating said materials from the clinker and calcining said materials at a temperature of incipient fusion to produce Portland cement clinker.

4. The process that includes, flowing a stream of finished hot Portland cement clinker from the discharge end of a kiln, admixing relatively cool argillaceous and calcareous materials with said hot clinker to cool the clinker and heat said materials, then separating said materials from the clinker, and feeding the separated argillaceous and calcareous materials into the feed end of said kiln.

5. The process that includes, flowing a stream of finished hot Portland cement clinker from the discharge end of a kiln, admixing relatively cool argillaceous and calcareous materials with said hot clinker to cool the clinker and heat said materials, then separating said materials from the clinker, and feeding the separated argillaceous and calcareous materials into the feed end of said kiln, while the materials are heated by heat derived from said clinker.

6. The process that includes admixing finished hot Portland cement clinker with a relatively cool Portland cement raw mixture to cool the clinker and heat the mixture, then separating said mixture from the clinker and calcining the separated mixture at a temperature of incipient fusion to produce Portland cement clinker.

7. The process that includes admixing finished hot Portland cement clinker with a relatively cool Portland cement raw mixture to rapidly quench the clinker and heat the mixture, then separating said mixture from the clinker and calcining the separated mixture while heated by heat derived from said clinker, at a temperature of incipient fusion to produce Portland cement clinker.

8. The process that includes rapidly quenching finished hot Portland cement clinker by intimately admixing the clinker with a relatively cool Portland cement raw mixture to cool the clinker and heat the mixture, then separating said mixture from the clinker and calcining the separated mixture at a temperature of incipient fusion to produce Portland cement clinker.

9. The process that includes, flowing a stream of finished hot Portland cement clinker from the discharge end of a kiln, admixing a relatively cool Portland cement raw mixture with said hot clinker to cool the clinker and heat said mixture, then separating said mixture from the clinker, and feeding the separated mixture into the feed end of said kiln.

10. The process that includes, flowing a stream of finished hot Portland cement clinker from the discharge end of a kiln, admixing a relatively cool Portland cement raw mixture with said hot clinker to cool the clinker and heat said mixture, then separating said mixture from the clinker, and feeding the separated mixture into the feed end of said kiln while said mixture remains heated by heat derived from said clinker.

11. The process that includes, flowing a stream of finished hot Portland cement clinker from the discharge end of a kiln, rapidly quenching said clinker by intimately admixing with the clinker a finely ground raw Portland cement mixture and thereby heating said mixture to a temperature below its temperature of incipient fusion, then separating said raw mixture from the clinker and calcining the separated mixture while thus heated, to produce Portland cement clinker.

12. The process that includes, flowing a stream of finished hot Portland cement clinker from the discharge end of a kiln, rapidly quenching said clinker by intimately admixing with the clinker a finely ground raw Portland cement mixture at a rate such that the potential Portland cement quantity of the raw mixture corresponds substantially to the quantity of clinker admixed therewith, and thereby heating said mixture to a temperature below its temperature of incipient fusion, then separating said raw mixture from the clinker and calcining the separated mixture while thus heated, to produce Portland cement clinker.

13. The process that includes, flowing a stream of finished hot Portland cement clinker from the discharge end of a kiln, rapidly quenching said clinker by intimately admixing with the clinker a finely ground raw Portland cement mixture and thereby heating said mixture to a temperature below its temperature of incipient fusion, then separating said raw mixture from the clinker and calcining the separated mixture while thus heated, to produce Portland cement clinker by feeding the mixture into said kiln.

14. The process that includes, flowing a stream of finished hot Portland cement clinker from the discharge end of a kiln, rapidly quenching said clinker by intimately admixing with the clinker a finely ground raw Portland cement mixture at a rate such that the potential Portland cement quantity of the raw mixture corresponds substantially to the quantity of clinker admixed therewith, and thereby heating said mixture to a temperature below its temperature of incipient fusion, then separating said raw mixture from the clinker and calcining the separated mixture while thus heated, to produce Portland cement clinker by feeding the mixture into said kiln.

15. The process that includes, flowing a stream of finished hot Portland cement clinker from the discharge end of a kiln, rapidly quenching said clinker by intimately admixing with the clinker a finely ground raw Portland cement mixture and thereby heating said mixture to a temperature below its temperature of incipient fusion, maintaining the admixture in an atmosphere containing carbon dioxid released from the raw mixture, then separating said raw mixture from the clinker and calcining the separated mixture while thus heated, to produce Portland cement clinker.

16. The process that includes, admixing finished hot Portland cement clinker with relatively cool and substantially dry argillaceous and calcareous materials to cool the clinker and partially calcine said materials, then separating said materials from the clinker, and calcining the materials at a temperature of incipient fusion to produce Portland cement clinker.

17. The process that includes, admixing finished hot Portland cement clinker with a relatively cool and substantially dry Portland cement raw mixture to rapidly quench the clinker, then separating said raw mixture from the quenched clinker and calcining the separated raw mixture at a temperature of incipient fusion to produce Portland cement clinker.

18. The process that includes, flowing a stream of finished hot Portland cement clinker from the discharge end of a kiln, then immediately admixing with the clinker a relatively cool and substantially dry finely ground Portland cement raw mixture, thereby rapidly quenching the clinker and partially calcining the raw mixture, separating said raw mixture from the quenched clinker and introducing the separated raw mixture into the feed end of the kiln while said mixture is heated by heat derived from the clinker.

HARRY E. KAISER.